United States Patent
Catania

(10) Patent No.: US 6,772,865 B2
(45) Date of Patent: Aug. 10, 2004

(54) BRAKE SHOE RETAINER CLIP

(75) Inventor: Michael Vito Catania, Clarkston, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/892,163

(22) Filed: Jun. 26, 2001

(65) Prior Publication Data

US 2002/0195302 A1 Dec. 26, 2002

(51) Int. Cl.[7] .......................... F16D 51/00; F16D 55/00
(52) U.S. Cl. ................ 188/341; 188/73.31; 188/206 R; 188/250 F
(58) Field of Search ............................ 188/74, 75, 325, 188/327, 330, 78, 252, 250 R, 250 A, 250 D, 250 F, 250 B; 384/296

(56) References Cited

U.S. PATENT DOCUMENTS

| | | | | |
|---|---|---|---|---|
| 2,781,868 A | * | 2/1957 | House ........................ | 188/330 |
| 3,275,103 A | * | 9/1966 | Lyon .......................... | 188/332 |
| 4,157,747 A | * | 6/1979 | Getz et al. ............... | 188/206 A |
| 4,206,834 A | * | 6/1980 | Williams ................ | 188/206 A |
| 4,332,311 A | * | 6/1982 | Nomura ..................... | 188/340 |
| 4,471,859 A | * | 9/1984 | Urban ........................ | 188/216 |
| 4,503,953 A | * | 3/1985 | Majewski ................... | 188/330 |
| 4,624,348 A | * | 11/1986 | Williams .................... | 188/330 |
| 4,648,491 A | * | 3/1987 | Taylor ........................ | 188/328 |
| 4,679,667 A | * | 7/1987 | Zawodni .................... | 188/216 |
| 4,807,729 A | * | 2/1989 | Sampson .................... | 188/330 |
| 4,981,200 A | * | 1/1991 | Gee ........................ | 188/205 R |
| 5,255,763 A | * | 10/1993 | Redgrave et al. ........... | 188/330 |
| 5,469,942 A | * | 11/1995 | Krumm, Sr. ............ | 188/250 B |
| 6,364,076 B1 | * | 4/2002 | Braun et al. ................ | 188/327 |

FOREIGN PATENT DOCUMENTS

EP 0044377 A1 * 1/1982

* cited by examiner

Primary Examiner—Jack W. Lavinder
Assistant Examiner—Melody M. Burch
(74) Attorney, Agent, or Firm—Carlson, Gaskey & Olds

(57) ABSTRACT

A retainer clip is used to maintain proper shoe contact and orientation for a cam actuated brake assembly. The cam actuated brake assembly includes a pair of brake shoes each having an anchor end and an actuation end. Each brake shoe is pivotally mounted at the anchor end to a brake spider with an anchor pin. When brakes are applied, a cam acts against the actuation end causing the brake shoes to pivot about axes defined by the anchor pins. Preferably the retainer clip is mounted to the brake shoe and includes a pair of hooks that support opposite ends of the anchor pin. The retainer clip cooperates with the anchor pins to maintain proper shoe geometry.

17 Claims, 2 Drawing Sheets

BRAKE SHOE RETAINER CLIP

BACKGROUND OF THE INVENTION

This invention relates to a retainer clip for a brake shoe that helps to maintain proper shoe geometry. Specifically, retainer clips are mounted to each brake shoe to interact with anchor pins for maintaining shoe contact, proper shoe orientation, and to prevent shoe drag when brakes are not applied.

Drum brakes are widely used in vehicle braking systems. In a typical drum brake, two arcuate brake shoe assemblies are located inside a rotating cylindrical brake drum. Each brake shoe assembly includes a backing plate that carries brake lining friction material. A brake actuator moves the brake shoe assemblies toward the rotating cylindrical brake drum such that the brake lining friction material contacts the inner surfaces of the rotating cylindrical brake drum, thus retarding the rotation of the rotating cylindrical brake drum.

The brake shoe assemblies are mounted to a central plate or brake spider. At one end each brake shoe assembly is pivotally supported on an anchor pin. At the opposite end of each brake shoe assembly, the brake actuator (typically a cam) applies an actuation force against the brake shoe assembly causing the brake shoe assemblies to pivot about axes define by the anchor pins. The brake actuator causes the brake shoe assemblies to pivot away from each other toward the rotating cylindrical brake drum. Return springs are used to return the brake shoe assemblies after each brake actuation. The drum brake also includes a pair of retainer springs for each brake shoe assembly mounted on an anchor pin end. The retainer springs maintain the shoe contact and orientation with the anchor pin and prevent the brake shoe assemblies from dragging when the drum brake is not applied.

In some instances, depending on the braking application, the retainer springs lack sufficient strength and fatigue life. In these circumstances, a heavier duty brake including a full web around the anchor pin is required, which increases cost.

Further, the retainer springs are an extension spring type that is designed such that in the installed condition the retainer spring is in a slight extension that results in a sufficient load to retain the weight of the brake shoe assembly relative to the anchor pin. The retainer spring includes a collection of closed coils with either hooks formed on ends of the coils or hook details attached to the ends of the coils.

There are several disadvantages to using an extension spring design. Coil clashing and stress concentrations can lead to early failure. Coil clashing is caused by the closed coil design where coils collide as a result of normal road vibration, which can result in fatigue failure. Another disadvantage is caused by the spring manufacturing process. This process typically includes coiling spring wire over a mandrel, which introduces a tool mark on the retainer spring. The small diameter of the retainer spring and the closed coil design do not permit process enhancements, such as shot peening, resulting in a stress concentration in the already highly stressed inner coil area. Also, crimping hooks onto the ends of the retainer spring introduces additional tool marks that result in stress concentrations.

Thus, it is desirable to have a brake retaining mechanism that does not require extension springs. The brake retaining mechanism should be robust and be able to be used in multiple brake shoe configurations in addition to overcoming the above referenced deficiencies with prior art systems.

SUMMARY OF THE INVENTION

The subject invention includes a retainer clip that is used to maintain proper shoe contact and orientation for a cam actuated brake assembly. The retainer clip eliminates the need for retaining springs currently used in the brake assembly to maintain proper shoe geometry. The retainer clip is mounted to a brake shoe and cooperates with a brake shoe anchor pin to consistently achieve the correct orientation.

In a disclosed embodiment, the brake assembly includes a pair of brake shoes having backing plates for supporting brake linings for actuation by a cam against a rotating drum. Each brake shoe has an anchor end and an actuation end. Each brake shoe is pivotally mounted at the anchor end to a brake spider with an anchor pin. When the brakes are applied, the cam acts against the actuation end causing the brake shoes to pivot away from one another about axes defined by the anchor pins.

In the preferred embodiment, the retainer clip is mounted to the backing plate of the brake shoe. The retainer clip includes a base plate with a pair of transversely extending legs that support opposite ends of the anchor pin. The base plate preferably includes a resilient tab portion that grips a portion of the backing plate. The anchor pin includes a cylindrical body having a pair of pin ends of smaller diameter than the cylindrical body extending outwardly from opposing sides of the cylindrical body. The transversely extending legs of the retainer clip preferably have hooked ends for engaging the pin ends. The hooked ends cooperate with the pin ends to maintain proper shoe geometry.

The subject invention provides a brake shoe retainer clip that eliminates the need for retaining springs. The retainer clip provides a more robust design and has increased fatigue life over prior art systems. These and other features of the present invention can be best understood from the following specification and drawings, the following of which is a brief description.

DETAILED DESCRIPTION OF AN EXEMPLARY EMBODIMENT

Figure 1:
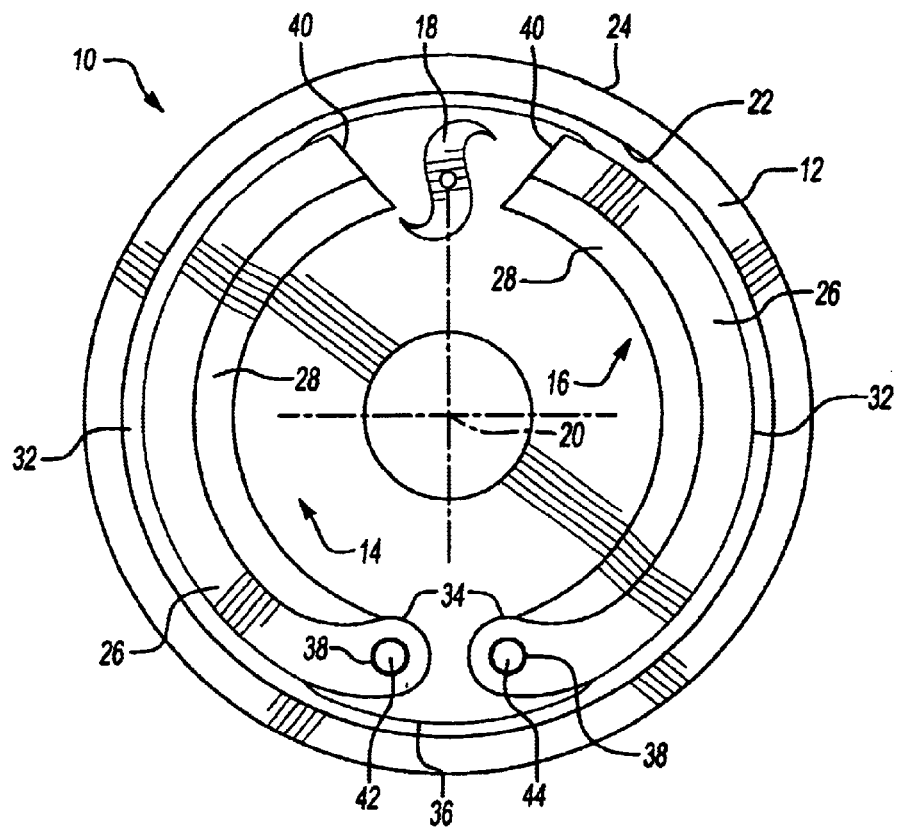
FIG. 1 is a schematic representation of a cam brake assembly incorporating the subject invention.

Referring to FIG. 1, a brake shoe assembly having a retaining clip in accordance with the present invention is shown installed in a vehicular brake system.

FIG. 1 is a side view of a drum brake system 10. The drum brake system 10 includes a cylindrical brake drum 12, a first brake shoe assembly generally shown at 14, a second brake shoe assembly generally shown at 16, and an actuator 18. The general operation of the drum brake system 10 is known. The first and second brake shoe assemblies 14 and 16 are preferably identical such that a description of the first brake shoe assembly 14 or its components is also applicable to the second brake shoe assembly 16. The actuator 18, shown schematically in FIG. 1, is an s-cam mechanism that is rotated during a brake actuation causing the brake shoes assemblies 14, 16 to engage the cylindrical brake drum 12.

The cylindrical brake drum 12, which rotates about an axis of rotation 20, has an inner surface 22 and an outer surface 24. The first and second brake shoe assemblies 14 and 16, located adjacent to the inner surface 22 of the cylindrical brake drum 12, include a brake lining 26 having a predetermined thickness. The brake linings 26 are comprised of a known friction material attached to a backing plate 28. Each brake lining 26 presents a wear surface 32, which contacts the inner surface 22 of the cylindrical brake drum 12 and wears further and further away each time the actuator 18 moves the first and second brake shoe assemblies 14 and 16 against the cylindrical brake drum 12.

Each brake shoe assembly 14, 16 is pivotally mounted at one end 34 to a brake spider 36 with an anchor pin 38. The ends 34 of the brake shoes assemblies 14, 16 are opposite from actuation ends 40 of the brake shoes assemblies 14, 16. The anchor pin 38 for the first brake shoe assembly 14 defines a first pivot axis 42 and the anchor pin 38 for the second brake shoe assembly 16 defines a second pivot axis 44. When brakes are applied, the actuator 18 pivots the brake shoe assemblies 14, 16 about the first 42 and second 44 pivot axes, respectively.

Figure 2:
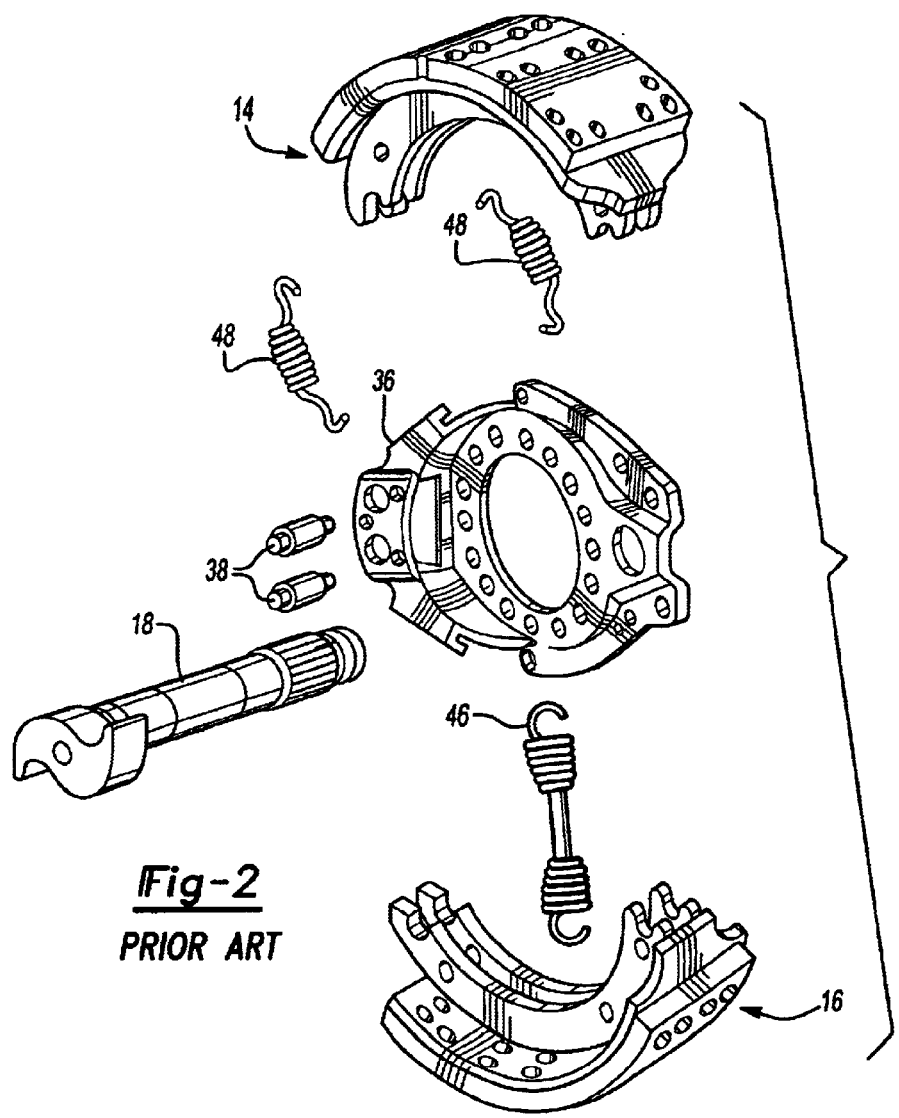
FIG. 2 is an exploded view of a prior art cam brake system.

A prior art cam brake assembly is shown in FIG. 2. This cam brake assembly includes a return spring 46 that returns the brake shoes assemblies 14, 16 to their original position after each brake actuation. The cam brake assembly also includes a pair of retainer springs 48 (only one set is shown) for each brake shoe assembly 14, 16 mounted on the anchor pin end. The retainer springs 48 maintain the shoe contact and orientation with the anchor pin 38 and prevent the brake shoes assemblies 14, 16 from dragging when the brake is not applied.

These retainer springs 48 are extension springs that are designed such that in the installed condition the extension spring is in a slight extension that results in a sufficient load to retain the weight of the brake shoe assembly relative to the anchor pin 38. The use of this type of extension spring is disadvantageous and can lead to early failure. Coil clashing caused by normal road vibration can result in early fatigue failure. The spring manufacturing process can introduce a tool marks on the extension spring resulting stress concentrations, which can lead to premature failure.

Figure 3:
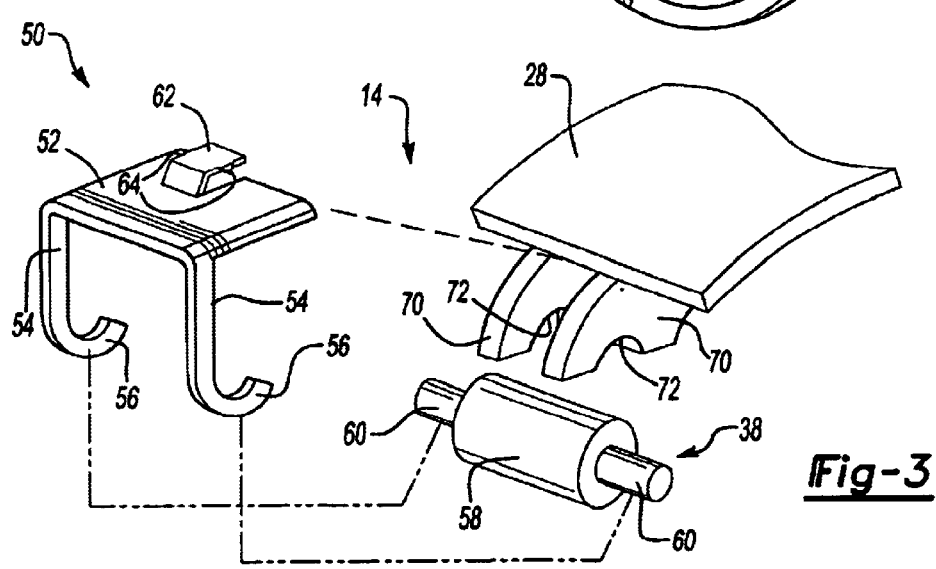
FIG. 3 is an exploded view, partially cut-away, of one embodiment of the subject invention.

Thus, the subject invention includes a retainer clip 50, shown in FIG. 3, which eliminates the need for retainer springs 48. The retainer clip 50 preferably includes a base portion 52 with a pair of transversely extending legs 54 positioned on opposite sides of the base portion 52. Each transversely extending leg 54 preferably has a hooked end 56 that engages the anchor pin 38. It should be understood that there is one retainer clip 50 for each brake shoe assembly 14, 16. Thus, the retainer clip 50 shown in FIG. 3 is the same for each brake shoe assembly 14, 16.

The anchor pin 38 includes a cylindrical body 58 and a pair of pin ends 60 positioned on opposite sides of the cylindrical body 58 to define the first pivot axis 42. The pin ends 60 have a significantly smaller diameter than the cylindrical body 58. The hooked ends 56 of the retainer clip 50 engage the pin ends 60 to maintain the proper shoe geometry.

The retainer clip 50 includes a connector portion that can be attached to any portion of the brake shoe assembly 14 with any known attachment method, however, in the preferred embodiment the retainer clip 50 is mounted to the backing plate 28 with a resilient tab 62. The resilient tab 62 includes at least one grip 64 to engage the backing plate 28. Preferably the grip 64 is a pointed tooth member that clips onto the backing plate 28 such that the resilient tab 62 is on one side of the backing plate 28 with the remaining portions of the base portion 52 being positioned on the opposite side of the backing plate 28.

Figure 4:
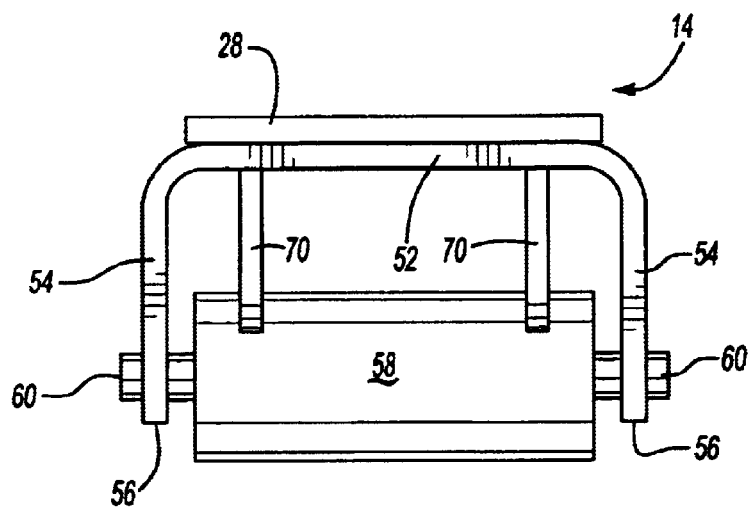
FIG. 4 is a side view of an alternate embodiment of the subject invention.

The retainer clip 50 can be attached to the backing plate 28, as shown in FIG. 3, or can be attached to another portion of the brake shoe assembly 14, as shown in FIG. 4. Each brake shoe assembly 14, 16 includes a pair of transversely extending webbed flanges 70 that extend inwardly toward the center of the brake assembly. The transversely extending webbed flanges 70 define an engagement surface 72 that receives a portion of the cylindrical body 58 of the anchor pin 38. In the alternate embodiment of FIG. 4, the retainer clip 50 is shown attached to the transversely extending webbed flanges 70. The retainer clip 50 can be attached to one or both of the transversely extending webbed flanges 70.

When the actuator 18 is applied, the brake shoe assemblies 14, 16, the retainer clips 50, and the anchor pins 38 pivot as a unit about their respective pivot axes 42, 44. The return spring 46 is used to return the brake shoes assemblies 14, 16 to their original position and the retainer clips 50 cooperate with the anchor pins 38 to maintain proper shoe contact and orientation.

The subject invention provides a brake shoe retainer clip 50 that eliminates the need for retainer springs 48. The retainer clip 50 provides a more robust design and has increased fatigue life over prior art systems.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A brake shoe assembly comprising:

a brake spider;

a mounting member supported on said brake spider and including an arcuate surface for supporting a brake lining;

an anchor pin pivotally mounting one end of said mounting member to said brake spider, said anchor pin including a cylindrical body with a pair of pin ends extending in opposite directions from said cylindrical body to define a pivot axis; and a single retainer clip in gripping engagement with said arcuate surface and cooperating with both of said pin ends to maintain proper shoe orientation, said single retainer clip including a base portion with a connector portion and a pair of legs extending outwardly from opposite ends of said base portion to support said anchor pin with said pin ends being supported by said legs wherein said single retainer clip, said anchor pin, and said mounting member are all rotated about said pivot axis during brake actuation.

2. The assembly according to claim 1 wherein said mounting member includes a backing plate defining said arcuate surface and a pair of spaced apart webbed flanges extending inwardly from said backing plate toward said pivot axis with said connector portion directly engaging said backing plate between said spaced apart webbed flanges to retain said single retainer clip on said mounting member.

3. A brake shoe assembly comprising:

a brake spider;

a mounting member supported on said brake spider and including a backing plate with an arcuate surface for supporting a brake lining and a pair of spaced apart webbed flanges;

an anchor pin pivotally mounting one end of said mounting member to said brake spider, said anchor pin including a cylindrical body with a pair of pin ends extending in opposite directions from said cylindrical body to define a pivot axis wherein said spaced apart webbed flanges extend inwardly from said backing plate toward said pivot axis; and a retainer clip attached to said mounting member and cooperating with said anchor pin to maintain proper shoe orientation wherein said retainer clip includes a base portion with a connector portion and a pair of legs extending outwardly from opposite ends of said base portion to support said pin ends of said anchor pin and wherein said connector portion includes a resiliently biased tab with at least one transversely extending grip for engaging said backing plate between said spaced apart webbed flanges to retain said retainer clip on said mounting member.

4. A cam brake assembly comprising:

a first brake shoe including a first backing plate for supporting a first brake lining;

a second brake shoe including a second backing plate for supporting a second brake lining wherein said second brake lining faces an opposite direction from said first brake lining;

a brake spider having a first mounting portion for attachment to said first brake shoe and a second mounting portion for attachment to said second brake shoe;

a first anchor pin pivotally attaching one end of said first brake shoe to said first mounting portion to define a first pivot axis, said first anchor pin including a first cylindrical body with a first pair of pin ends extending in opposite directions from said first cylindrical body;

a second anchor pin pivotally attaching one end of said second brake shoe to said second mounting portion to define a second pivot axis, said second anchor pin including a second cylindrical body with a second pair of pin ends extending in opposite directions from said second cylindrical body;

an actuator for pivoting opposite ends of said first and second brake shoes about said first and second pivot axes, respectively, during a brake actuation;

a first retainer clip including a first connector portion directly attached to said first backing plate and a first pair of legs interconnected by a first base portion with said first pair of legs cooperating with said first pair of pin ends to maintain proper contact and orientation between said first anchor pin and said first brake shoe; and a second retainer clip including a second connector portion directly attached to said second backing plate and a second pair of legs interconnected by a second base portion with said second pair of legs cooperating with said second pair of pin ends to maintain proper contact and orientation between said second anchor pin and said second brake shoe.

5. The assembly according to claim 4 wherein said first and second pairs of legs are comprised of a pair of hooked legs for supporting said first and second pairs of pin ends.

6. The assembly according to claim 4 wherein said first retainer clip, said first brake shoe, and said first anchor pin all pivot about said first pivot axis during a brake actuation and said second retainer clip, said second brake shoe, and said second anchor pin all pivot about said second pivot axis during a brake actuation.

7. The assembly according to claim 4 wherein said first retainer clip is a single piece retainer clip with said first pair of legs being integrally formed as one piece with said first base portion and wherein said second retainer clip is a single piece retainer clip with said second pair of legs being integrally farmed as one piece with said second base portion.

8. The assembly according to claim 4 wherein said first base portion extends parallel to said first cylindrical body between said first pair of pin ends and wherein said second base portion extends parallel to said second cylindrical body between said second pair of pin ends.

9. The assembly according to claim 4 wherein said first connector portion is centrally positioned on said first base portion and said second connector portion is centrally positioned on said second base portion.

10. The assembly according to claim 9 wherein said first connector portion includes a first resiliently biased grip and said second connector portion includes a second resiliently biased grip.

11. The assembly according to claim 10 wherein said first brake shoe includes a first pair of spaced apart webbed flanges extending outwardly from said first backing plate with said first resiliently biased grip being in direct engagement with said first backing plate at a position between said first pair of spaced apart webbed flanges and said second brake shoe includes a second pair of spaced apart webbed flanges extending outwardly from said second backing plate with said second resiliently biased grip being in direct engagement with said second backing plate at a position between said second pair of spaced apart webbed flanges.

12. A cam brake assembly comprising:

a first brake shoe including a first backing plate for supporting a first brake lining;

a second brake shoe including a second backing plate for supporting a second brake lining wherein said second brake lining faces an opposite direction from said first brake lining;

a brake spider having a first mounting portion for attachment to said first brake shoe and a second mounting portion for attachment to said second brake shoe;

a first anchor pin pivotally attaching one end of said first brake shoe to said first mounting portion to define a first pivot axis;

a second anchor pin pivotally attaching one end of said second brake shoe to said second mounting portion to define a second pivot axis;

an actuator for pivoting opposite ends of said first and second brake shoes about said first and second pivot axes, respectively, during a brake actuation;

a first retainer clip attached to said first brake shoe for cooperation with said first anchor pin to maintain proper contact and orientation between said first anchor pin and said first brake shoe; and a second retainer clip attached to said second brake shoe for cooperation with said second anchor pin to maintain proper contact and orientation between said second anchor pin and said second brake shoe wherein each of said first and second retainer clips includes a connector portion having a resilient tab with at least one grip for engaging a portion of said first and second brake shoes to retain said first and second retainer clips to said first and second brake shoes.

13. A brake shoe assembly comprising:

a brake spider;

a mounting member supported on said brake spider and including a backing plate with an arcuate surface for supporting a brake lining and a pair of spaced apart webbed flanges extending outwardly from said backing place;

an anchor pin pivotally mounting one end of said mounting member to said brake spider, said anchor pin including a cylindrical body with a pair of pin ends extending in opposite directions from said cylindrical body; and a single retainer clip directly attached to said backing plate at a position between said spaced apart webbed flanges and cooperating with both of said pin ends to maintain proper shoe orientation wherein said single retainer clip, said anchor pin, and said mounting member are all pivotable about a common pivot axis to maintain proper shoe orientation independently from a second brake shoe assembly.

14. The assembly according to claim 13 wherein said single retainer clip comprises a base portion integrally formed with a pair of transversely extending legs positioned on opposite sides of said base portion for engagement with said pin ends.

15. The assembly according to claim 14 wherein said cylindrical body has a greater diameter than said pin ends.

16. The assembly according to claim 14 wherein said base portion includes a connector portion in gripping engagement with said backing plate.

17. The assembly according to claim 16 wherein said connector portion comprises a resiliently biased tab positioned centrally on said base portion.

* * * * *

UNITED STATES PATENT AND TRADEMARK OFFICE
CERTIFICATE OF CORRECTION

PATENT NO. : 6,772,865 B2
DATED : August 10, 2004
INVENTOR(S) : Catania

It is certified that error appears in the above-identified patent and that said Letters Patent is hereby corrected as shown below:

Column 6,
Line 8, "farmed" should be -- formed --

Column 7,
Line 5, "place" should be -- plate --

Signed and Sealed this

First Day of February, 2005

JON W. DUDAS
*Director of the United States Patent and Trademark Office*